United States Patent
Tripathi et al.

(10) Patent No.: US 7,630,368 B2
(45) Date of Patent: Dec. 8, 2009

(54) VIRTUAL NETWORK INTERFACE CARD LOOPBACK FASTPATH

(75) Inventors: Sunay Tripathi, San Jose, CA (US); Erik Nordmark, Mountain View, CA (US); Nicolas G. Droux, Rio Rancho, NM (US)

(73) Assignee: Sun Microsystems, Inc., Santa Clara, CA (US)

(*) Notice: Subject to any disclaimer, the term of this patent is extended or adjusted under 35 U.S.C. 154(b) by 452 days.

(21) Appl. No.: 11/479,946

(22) Filed: Jun. 30, 2006

(65) Prior Publication Data

US 2008/0002663 A1    Jan. 3, 2008

(51) Int. Cl.
*H04L 12/28* (2006.01)

(52) U.S. Cl. .................................. 370/389; 370/419

(58) Field of Classification Search .............. 370/389, 370/395.31, 395.32
See application file for complete search history.

(56) References Cited

U.S. PATENT DOCUMENTS

| | | | |
|---|---|---|---|
| 5,852,630 A * | 12/1998 | Langberg et al. ............ 375/219 |
| 6,041,053 A | 3/2000 | Douceur et al. |
| 6,070,219 A * | 5/2000 | McAlpine et al. ........... 710/263 |
| 6,163,539 A | 12/2000 | Alexander et al. |
| 6,477,643 B1 | 11/2002 | Vorbach et al. |
| 6,600,721 B2 | 7/2003 | Edholm |
| 6,714,960 B1 | 3/2004 | Bitar et al. |
| 6,757,731 B1 | 6/2004 | Barnes et al. |
| 6,831,893 B1 | 12/2004 | Ben Nun et al. |
| 6,859,841 B2 | 2/2005 | Narad et al. |
| 6,944,168 B2 | 9/2005 | Paatela et al. |
| 7,046,665 B1 | 5/2006 | Walrand et al. |
| 7,177,311 B1 | 2/2007 | Hussain et al. |
| 7,260,102 B2 | 8/2007 | Mehrvar et al. |
| 7,313,142 B2 | 12/2007 | Matsuo et al. |
| 2003/0037154 A1 | 2/2003 | Poggio et al. |
| 2004/0083481 A1* | 4/2004 | Shultz et al. ................ 719/312 |
| 2004/0267866 A1 | 12/2004 | Carollo et al. |
| 2005/0111455 A1 | 5/2005 | Nozue et al. |
| 2005/0135243 A1 | 6/2005 | Lee et al. |
| 2005/0138620 A1 | 6/2005 | Lewites |
| 2006/0041667 A1 | 2/2006 | Ahn et al. |

(Continued)

OTHER PUBLICATIONS

"Solaris Networking—The Magic Revealed (Part I)"; Sunay Tripathi's Solaris Networking Weblog; Nov. 14, 2005, pp. 1-22 (22 pages).

(Continued)

*Primary Examiner*—Jayanti K Patel
*Assistant Examiner*—Bo Hui A Zhu
(74) *Attorney, Agent, or Firm*—Osha • Liang LLP (57) ABSTRACT

A method for routing packets includes receiving an outbound packet issued by a first virtual machine, wherein the first virtual machine is located on a host, determining a packet destination associated with the outbound packet, querying a routing table for a routing entry corresponding to the packet destination, wherein the routing table comprises a first routing entry referencing an external host and a second routing entry referencing a second virtual machine, wherein the second virtual machine is located on the host, if the routing entry corresponding to the packet destination is the first routing entry, passing the packet to the external host, and if the routing entry corresponding to the packet destination is the second routing entry, passing the packet to the second virtual machine.

19 Claims, 5 Drawing Sheets

U.S. PATENT DOCUMENTS

2006/0045089 A1 3/2006 Bacher et al.
2006/0070066 A1 3/2006 Grobman
2006/0079284 A1* 4/2006 Lu et al. .................... 455/558
2006/0174324 A1 8/2006 Zur et al.

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

* cited by examiner

FIGURE 1

Routing Table 200

| | Destination 205 | Gateway 210 | Interface 215 | Pointer 220 | Cookie 225 |
|---|---|---|---|---|---|
| Localhost Routing Entry 245 | 127.0.0.1 | 127.0.0.1 | lo | ext_xmit() | null |
| Default Routing Entry 250 | 0.0.0.0 | 192.168.1.1 | eth1 | ext_xmit() | null |
| Local Network Routing Entry 255 | 198.167.10.0 | 198.167.1.1 | eth0 | ext_xmit() | null |
| Virtual Machine Routing Entry 260 | 11.0.1.0 | 11.0.1.5 | XNI1 | local_xmit() | VNIC2 |

VIRTUAL NETWORK INTERFACE CARD LOOPBACK FASTPATH

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11,479,046; "Method and System for Controlling Virtual Machine Bandwidth" with U.S. application Ser. No. 11/480,000; "Virtual Switch" with U.S. application Ser. No. 11,480,261; "System and Method for Virtual Network Interface Cards Based on Internet Protocol Addresses" with U.S. application Ser. No. 11,479,997; "Bridging Network Components" with U.S. application Ser. No. 11/479,948; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,998; "Method and Apparatus for Dynamic Assignment of Network Interface Card Resources" with U.S. application Ser. No. 11/479,817; "Generalized Serialization Queue Framework for Protocol Processing" with U.S. application Ser. No. 11/479,941; "Serialization Queue Framework for Transmitting Packets" with U.S. application Ser. No. 11/479,143.

BACKGROUND

Network traffic is transmitted from a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are forwarded to a temporary data structure (e.g., a transmit ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method for routing packets, comprising receiving an outbound packet issued by a first virtual machine, wherein the first virtual machine is located on a host, determining a packet destination associated with the outbound packet, querying a routing table for a routing entry corresponding to the packet destination, wherein the routing table comprises a first routing entry referencing an external host and a second routing entry referencing a second virtual machine, wherein the second virtual machine is located on the host, if the routing entry corresponding to the packet destination is the first routing entry, passing the packet to the external host, and if the routing entry corresponding to the packet destination is the second routing entry, passing the packet to the second virtual machine.

In general, in one aspect, the invention relates to a system for routing packets, comprising a first virtual machine and a second virtual machine located on a host, and a routing table associated with the first virtual machine, wherein the routing table comprises a first routing entry referencing an external host and a second routing entry referencing the second virtual machine, wherein the host is configured to receive an outbound packet issued by the first virtual machine, determine a packet destination associated with the outbound packet, query the routing table for a routing entry corresponding to the packet destination, if the routing entry corresponding to the packet destination is the first routing entry, pass the packet to the external host, and if the routing entry corresponding to the packet destination is the second routing entry, pass the packet to the second virtual machine.

In general, in one aspect, the invention relates to a computer usable medium comprising computer readable program code embodied therein for causing a computer system to execute a method for routing packets, the computer readable program code configured to receive an outbound packet issued by a first virtual machine, wherein the first virtual machine is located on a host, determine a packet destination associated with an outbound packet, wherein the outbound packet issued by a first virtual machine and the first virtual machine is located on a host, query a routing table for a routing entry corresponding to the packet destination, wherein the routing table comprises: a first routing entry referencing an external host and a second routing entry referencing a second virtual machine, wherein the second virtual machine is located on the host, if the routing entry corresponding to the packet destination is the first routing entry, pass the packet to the external host, and if the routing entry corresponding to the packet destination is the second routing entry, pass the packet to the second virtual machine.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus to route outgoing packets to both local and network destinations. Local destinations include virtual machines on the same physical host, whereas network destinations are sent through a physical network, such as Ethernet, to other hosts. Outgoing packets may originate in a virtual machine and may be passed to a virtual network interface card (NIC) before being transmitted to another virtual machine or host.

Specifically, embodiments of the invention provide a method and apparatus for transmitting packets from a first virtual machine to a second virtual machine when both virtual machines are located on the same physical host. In one or more embodiments of the invention, the packet is written directly to local memory residing in the memory space of the second virtual machine without going through a NIC or a virtual NIC.

Figure 1:
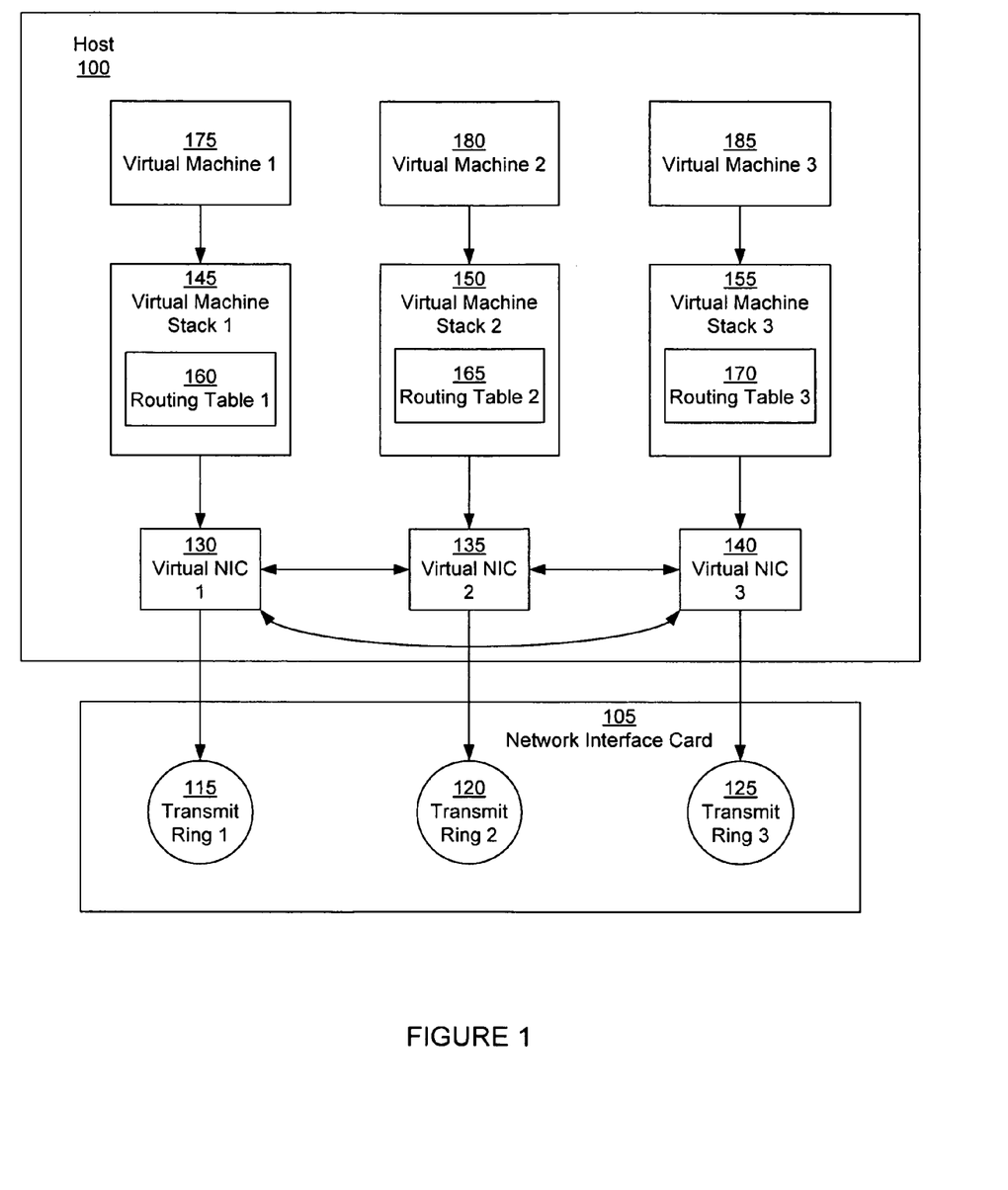
FIG. 1 shows a schematic diagram in accordance with one or more embodiments of the invention.

FIG. 1 shows a schematic diagram of a system in accordance with one or more embodiments of the invention. As shown in FIG. 1, the system includes a host (100), a network interface card (NIC) (105), multiple virtual NICs (e.g., virtual NIC 1 (130), virtual NIC 2 (135), virtual NIC 3 (140)), multiple virtual machines (e.g., virtual machine 1 (175), virtual machine 2 (180), virtual machine 3 (185)), and multiple virtual machine stacks (e.g., virtual machine stack 1 (145), virtual machine stack 2 (150), virtual machine stack 3 (155)). Each of these components is described below.

The NIC (105) provides an interface between the host (100) and a network (not shown) (e.g., a local area network, a wide area network, a wireless network, etc.). More specifically, the NIC (105) includes a network interface (NI) (i.e., the hardware on the NIC used to interface with the network). For example, the NI may correspond to an RJ-45 connector, a wireless antenna, etc. The packets received by the NI are then forwarded to other components on the NIC (105) for processing. In one embodiment of the invention, the NIC (105) includes one or more transmit rings (e.g., transmit ring 1 (115), transmit ring 2 (120), transmit ring 3 (125)). In one embodiment of the invention, the transmit rings (e.g., transmit ring 1 (115), transmit ring 2 (120), transmit ring 3 (125)) correspond to portions of memory within the NIC (105) used to temporarily store packets to be transmitted to the network. Further, in one embodiment of the invention, a ring element of the transmit rings (e.g., transmit ring 1 (115), transmit ring 2 (120), transmit ring 3 (125)) may point to host memory.

In one or more embodiments of the invention, the host (100) may include a device driver (not shown) and one or more virtual NICs (e.g., virtual NIC 1 (130), virtual NIC 2 (135), virtual NIC 3 (140)). In one embodiment of the invention, the device driver provides an interface between the transmit rings (e.g., transmit ring 1 (115), transmit ring 2 (120), transmit ring 3 (125)) and the host (100). More specifically, the device driver (not shown) exposes the transmit rings (e.g., transmit ring 1 (115), transmit ring 2 (120), transmit ring 3 (125)) to the host (100). In one embodiment of the invention, each of the virtual NICs (e.g., virtual NIC 1 (130), virtual NIC 2 (135), virtual NIC 3 (140)) is associated with one or more transmit rings (e.g., transmit ring 1 (115), transmit ring 2 (120), transmit ring 3 (125)). In other words, a virtual NIC (e.g., virtual NIC 1 (130), virtual NIC 2 (135), virtual NIC 3 (140)) passes an outgoing packet to the corresponding transmit ring (e.g., transmit ring 1 (115), transmit ring 2 (120), transmit ring 3 (125)), which stores the packet until the packet is sent to the network.

In one or more embodiments of the invention, the virtual NICs (e.g., virtual NIC 1 (130), virtual NIC 2 (135), virtual NIC 3 (140)) are operatively connected to virtual machines (e.g., virtual machine 1 (175), virtual machine 2 (180), virtual machine 3 (185)) via the virtual machine stacks (e.g., virtual machine stack 1 (145), virtual machine stack 2 (150), virtual machine stack 3 (155)). The virtual NICs (e.g., virtual NIC 1(130), virtual NIC 2 (135), virtual NIC 3 (140)) provide an abstraction layer between the NIC (105) and the virtual machines (e.g., virtual machine 1 (175), virtual machine 2 (180), virtual machine 3 (185)) on the host (100). More specifically, each virtual NIC (e.g., virtual NIC 1(130), virtual NIC 2 (135), virtual NIC 3 (140)) operates like a NIC (105). For example, in one embodiment of the invention, each virtual NIC (e.g., virtual NIC 1 (130), virtual NIC 2 (135), virtual NIC 3 (140)) is associated with one or more Internet Protocol (IP) addresses, one or more ports, and configured to handle one or more protocol types. Thus, while the host (100) may be operatively connected to a single NIC (105), virtual machines (e.g., virtual machine 1 (175), virtual machine 2 (180), virtual machine 3 (185)) executing on the host (100) operate as if the host (100) is bound to multiple NICs. Further, each virtual machine (e.g., virtual machine 1 (175), virtual machine 2 (180), virtual machine 3 (185)) has no knowledge of the other virtual machines residing on the host (100). Packets bound for other virtual machines (e.g., virtual machine 1 (175), virtual machine 2 (180), virtual machine 3 (185)) appear the same to a virtual machine as packets bound for external hosts.

In one or more embodiments of the invention, each virtual machine stack (e.g., virtual machine stack 1 (145), virtual machine stack 2 (150), virtual machine stack 3 (155)) includes functionality to process packets in accordance with various protocols used to send and receive packets (e.g., Transmission Communication Protocol (TCP), Internet Protocol (IP), User Datagram Protocol (UDP), etc.). Further, each virtual machine stack (e.g., virtual machine stack 1 (145), virtual machine stack 2 (150), virtual machine stack 3 (155)) may also include functionality, as needed, to perform additional processing on the incoming and outgoing packets. This additional processing may include, but is not limited to, cryptographic processing, firewall routing, etc.

In one or more embodiments of the invention, the virtual machine stacks (e.g., virtual machine stack 1 (145), virtual machine stack 2 (150), virtual machine stack 3 (155)) correspond to network stacks with network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.).

Each virtual machine stack (e.g., virtual machine stack 1 (145), virtual machine stack 2 (150), virtual machine stack 3 (155)) is associated with a routing table (e.g., routing table 1 (160), routing table 2 (165), routing table 3 (170)). In one or more embodiments of the invention, the routing tables (e.g., routing table 1 (160), routing table 2 (165), routing table 3 (170)) contain routing entries specifying the network paths for various packet destinations. For example, the routing tables (e.g., routing table 1 (160), routing table 2 (165), routing table 3 (170)) may contain routing entries for default, local network, localhost, and local virtual machine (e.g., virtual machine 1 (175), virtual machine 2 (180), virtual machine 3 (185)) packet destinations. Packets destined for external hosts are routed to the physical network, whereas packets destined for other virtual machines (e.g., virtual machine 1 (175), virtual machine 2 (180), virtual machine 3 (185)) on the same host (100) are written to the appropriate memory addresses on the host (100). Packets destined for other virtual machines (e.g., virtual machine 1 (175), virtual machine 2 (180), virtual machine 3 (185)) may be passed to the corresponding virtual NICs (e.g., virtual NIC 1(130), virtual NIC 2 (135), virtual NIC 3 (140)), or the packets may be written directly to the memory space of the receiving virtual machine. In one or more embodiments of the invention, packets are transmitted to packet destinations via a function pointer and cookie defined on routing entries in the routing table (e.g., routing table 1 (160), routing table 2 (165), routing table 3 (170)). The routing table (e.g., routing table 1 (160), routing table 2 (165), routing table 3 (170)) is described below in FIG. 2.

In one or more embodiments of the invention, an outgoing packet from a sending virtual machine (e.g., virtual machine 1 (175), virtual machine 2 (180), virtual machine 3 (185)) is passed to the virtual machine stack (e.g., virtual machine stack 1 (145), virtual machine stack 2 (150), virtual machine stack 3 (155)) associated with the sending virtual machine. There, the virtual machine stack (e.g., virtual machine stack 1 (145), virtual machine stack 2 (150), virtual machine stack 3 (155)) determines the packet destination for the packet and queries the routing table (e.g., routing table 1 (160), routing table 2 (165), routing table 3 (170)) for a routing entry associated with the packet destination. The packet is then forwarded to the NIC (105) if the packet destination is an external host, or the packet is transmitted to another virtual NIC (e.g., virtual NIC 1(130), virtual NIC 2 (135), virtual NIC 3 (140)) corresponding to a virtual machine (e.g., virtual machine 1 (175), virtual machine 2 (180), virtual machine 3 (185)) if the packet destination is another virtual machine on the same host. If the packet destination is an external host, the packet is forwarded to the next hop in the network path to the external host. In one or more embodiments of the invention, the packet is written directly to a memory address in the memory space of the receiving virtual machine (e.g., virtual machine 1 (175), virtual machine 2 (180), virtual machine 3 (185)) instead of being transmitted to the NIC (105) or passed to the virtual NIC (e.g., virtual NIC 1 (130), virtual NIC 2 (135), virtual NIC 3 (140)) of the sending virtual machine or receiving virtual machine.

Figure 2:
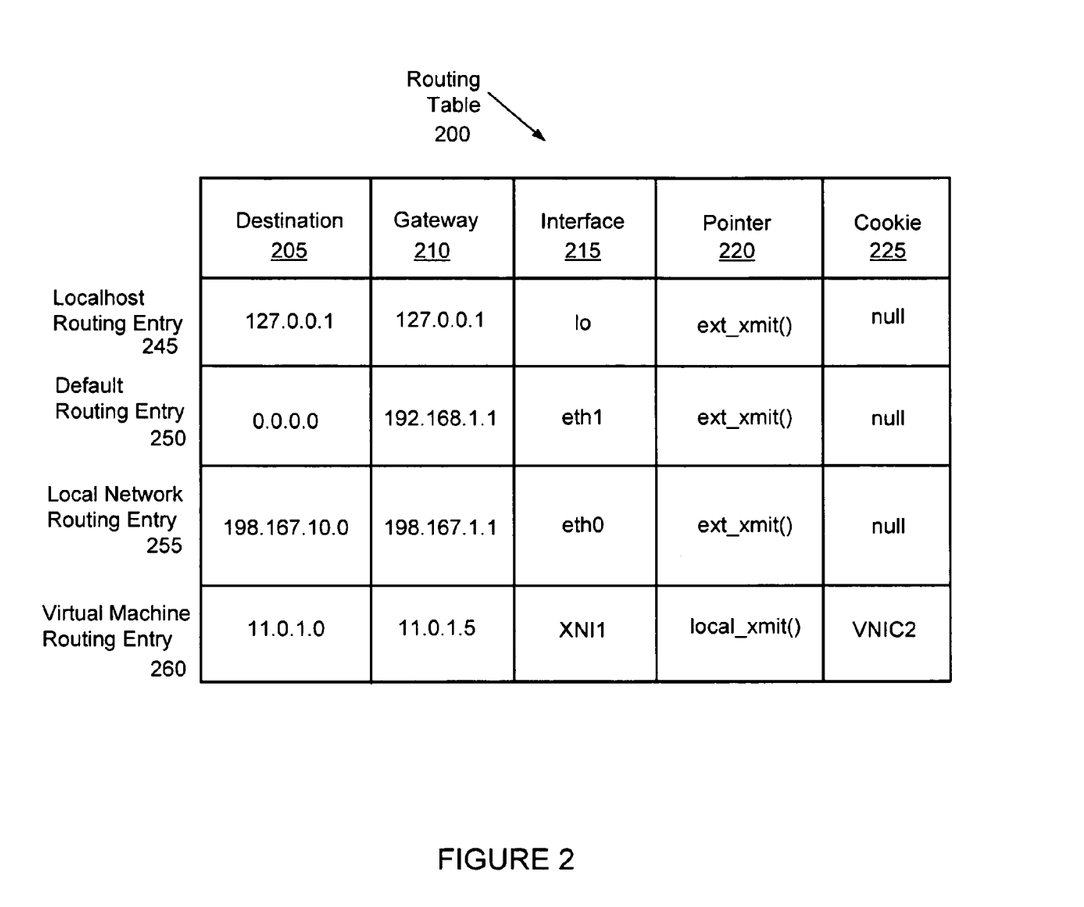
FIG. 2 shows a routing table in accordance with one or more embodiments of the invention.

FIG. 2 shows a routing table in accordance with one or more embodiments of the invention. As shown in FIG. 2, the routing table (200) includes a localhost routing entry (245), a default routing entry (250), a local network routing entry (255), and a VNIC routing entry (260). Each routing entry in the routing table (200) includes a field for a destination (205), gateway (210), interface (215), pointer (220), and a cookie (225). Those skilled in the art will appreciate that the routing table (200) may contain other routing entries, and that the existing routing entries may be configured in different ways and contain additional fields.

The localhost routing entry (245) defines the standard TCP/IP loopback network. Any packets sent on the loopback network are destined for the virtual machine which sent the packet(s). In addition, packets sent on the loopback network do not access a physical network. As with a standard loopback network, the localhost routing entry (245) has field values of 127.0.0.1 for the destination (205) and gateway (210) and "lo" for the interface (215) in accordance with one or more embodiments of the invention.

The default routing entry (250) is used when none of the routing entries in the routing table (200) match the packet destination of an outgoing packet. In one or more embodiments of the invention, the default routing entry (250) points to a router connected to an Internet Service Provider (ISP). Packets forwarded along the default route are destined towards the Internet, which the host is connected to via the ISP. As shown in the routing table (200), the default routing entry (250) has standard field values of 0.0.0.0 for the destination (205), a sample IP address for a router connected to the Internet of 192.168.1.1 for the gateway (210), and eth1 (i.e. external network) for the interface (215) in accordance with one or more embodiments of the invention.

The local network routing entry (255) relates to a network route for the locally connected network. For example, the local network routing entry (255) may pertain to a Local Area Network (LAN) that the host is on. Packets forwarded along the local network routing entry (255) may be meant for other hosts on the LAN. As an example, the local network routing entry (255) in the routing table (200) contains sample field values of 198.167.10.0 for the destination (205), 192.167.1.1 for the gateway, and eth0 (i.e. internal network) for the interface (215).

In one or more embodiments of the invention, the virtual machine routing entry (260) is used to route packets to another virtual machine located on the same physical host. For example, if a host contained three virtual machines, each virtual machine would have a routing table with routing entries for each of the other two virtual machines. In one or more embodiments of the invention, the virtual machine routing entry (260) allows packets destined for another virtual machine on the same host to be directly sent to the other virtual machine. In one or more embodiments of the invention, a virtual machine routing entry (260) is automatically created when a new virtual machine is added to the host. In one or more embodiments of the invention, the host operating system creates a routing entry associated with the new virtual machine in the routing tables of existing virtual machines on the host.

Referring to the virtual machine routing entry (260), the destination (205) is assigned a value of 11.0.1.0, the gateway (210) is assigned a value of 11.0.1.5, and the interface (215) contains a value of "XNI1." In one or more embodiments of the invention, the destination (205) and gateway (210) are sample IP addresses for the receiving virtual machine and sending virtual machine, respectively. For example, a routing table associated with a first virtual machine with a routing entry for a second virtual machine would list the destination (205) as the IP address of the second virtual machine and the gateway (210) as the IP address of the first virtual machine. In one or more embodiments of the invention, the interface (215) for a virtual machine routing entry (260) refers to the pseudodriver (not shown) of the sending virtual machine. In one or more embodiments of the invention, the pseudodriver of a virtual machine converts the memory mappings of incoming packets from host operating system memory to the virtual machine's memory. In addition, the pseudodriver of a virtual machine converts memory mappings of outgoing packets from the virtual machine's memory to host operating system memory. In one or more embodiments of the invention, the pseudodriver of the sending virtual machine serves as the interface (215) for an outgoing packet destined for another virtual machine on the same host.

As shown in the routing table (200) of FIG. 2, each routing entry also includes fields for a pointer (220) and a cookie (225). In one or more embodiments of the invention, outgoing packets are forwarded to its respective destinations using a function pointer and a cookie referenced in the pointer (220) and cookie (225) fields of the routing entry. As shown in the routing table (200), the localhost routing entry (245), default routing entry (250), and local network routing entry (255) contain "ext_xmit( )" for the pointer (220) field and "null" for the cookie (225) field. In one or more embodiments of the invention, "ext_xmit( )" relates to an external transmit function that passes the outgoing packet to the physical NIC, where the outgoing packet is transmitted to the physical network. The cookie (225) is set to "null" for these routing entries because a cookie is not necessary for transmitting outgoing packets over a physical network.

In one or more embodiments of the invention, packets corresponding to the localhost routing entry (245) are passed to the "ext_xmit( )" function, which sends the packets to the NIC. The NIC then checks the destination IP address of each packet, recognizes that the packets target the sending virtual machine, and relays the packet back to the sending virtual machine. Those skilled in the art will appreciate that other methods of implementing standard loopback can be used. For example, the pointer (220) for the localhost routing entry (245) may be set to "null"; packets sent along the standard loopback route would then be transferred within the same virtual machine.

Instead of "ext_xmit( )" and "null", the virtual machine routing entry (260) contains a pointer (220) value of "local_xmit( )" and a cookie (225) set to "VNIC2." In one or more embodiments of the invention, "local_xmit( )" refers to a local transmit function that passes the outgoing packet to another virtual machine on the same host without accessing the physical network. In one or more embodiments of the invention, the outgoing packet is passed to the pseudodriver of the sending virtual machine, where the packet is converted to the memory space of the host operating system and sent to the pseudodriver of the receiving virtual machine. As shown in the virtual machine routing entry (260) of the routing table (200), the interface (215) "XNI1" refers to the pseudodriver of a virtual machine, which may be associated with a virtual NIC designated "VNIC1." The cookie (225) is named "VNIC2" because the routing entry points to the virtual NIC designated "VNIC2", which is associated with another virtual machine. In one or more embodiments of the invention, the pointer (220) and cookie (225) are provided by the virtual NIC corresponding to the virtual machine. For example, in FIG. 2, the pointer (220) and cookie (225) are provided by VNIC1, which is associated with the sending virtual machine. In one or more embodiments of the invention, the destination (205) of the virtual machine routing entry (260) refers to the IP address of the virtual machine associated with VNIC2, and the gateway (210) of the virtual machine routing entry (260) refers to the IP address of the virtual machine associated with VNIC1. In addition, the routing table (200) is stored in the virtual machine stack of the virtual machine associated with VNIC1.

In one or more embodiments of the invention, the cookie (225) of the virtual machine routing entry (260) contains information needed to write a packet into a memory address in the memory space of another virtual machine on the same host. In one or more embodiments of the invention, a packet is written into the memory space of a receiving virtual machine by being passed to the pseudodriver of the sending virtual machine, where the packet is converted into the memory space of the host. Next, the packet is sent to the pseudodriver of the receiving virtual machine, where the pseudodriver of the receiving virtual machine converts the packet into the memory space of the receiving virtual machine and writes the packet into the memory of the receiving virtual machine.

Alternatively, the cookie (225) may contain information that allows the pseudodriver of the sending virtual machine to write the packet directly to the receiving virtual machine without passing the packet to the pseudodriver of the receiving virtual machine. For example, the cookie (225) may contain a memory address for the receiving virtual machine that is mapped to the host operating system memory; the pseudodriver of the sending virtual machine would only need to convert the packet into host operating system memory before writing the packet to the receiving virtual machine's memory. Those skilled in the art will appreciate that the cookie (225) may contain other types of information for passing packets to another virtual machine. For example, the cookie (225) may reference the virtual NIC corresponding to the receiving virtual machine; as a result, the packet would be passed to the virtual NIC corresponding to the receiving virtual machine, which would possibly perform additional processing on the packet, such as removing headers, before passing the packet to the receiving virtual machine.

In one embodiment of the invention, a hardware address, such as Media Access Control (MAC) address, is listed in the destination (205) field of the routing table (200) instead of (or in addition to) the IP address. In the case where each entry in the routing table (200) includes MAC address, the MAC address as opposed to the IP address, may be used for the purpose of identifying the correct routing entry to use to forward the packet and each VNIC in the host is associated with a MAC address.

Figure 3:
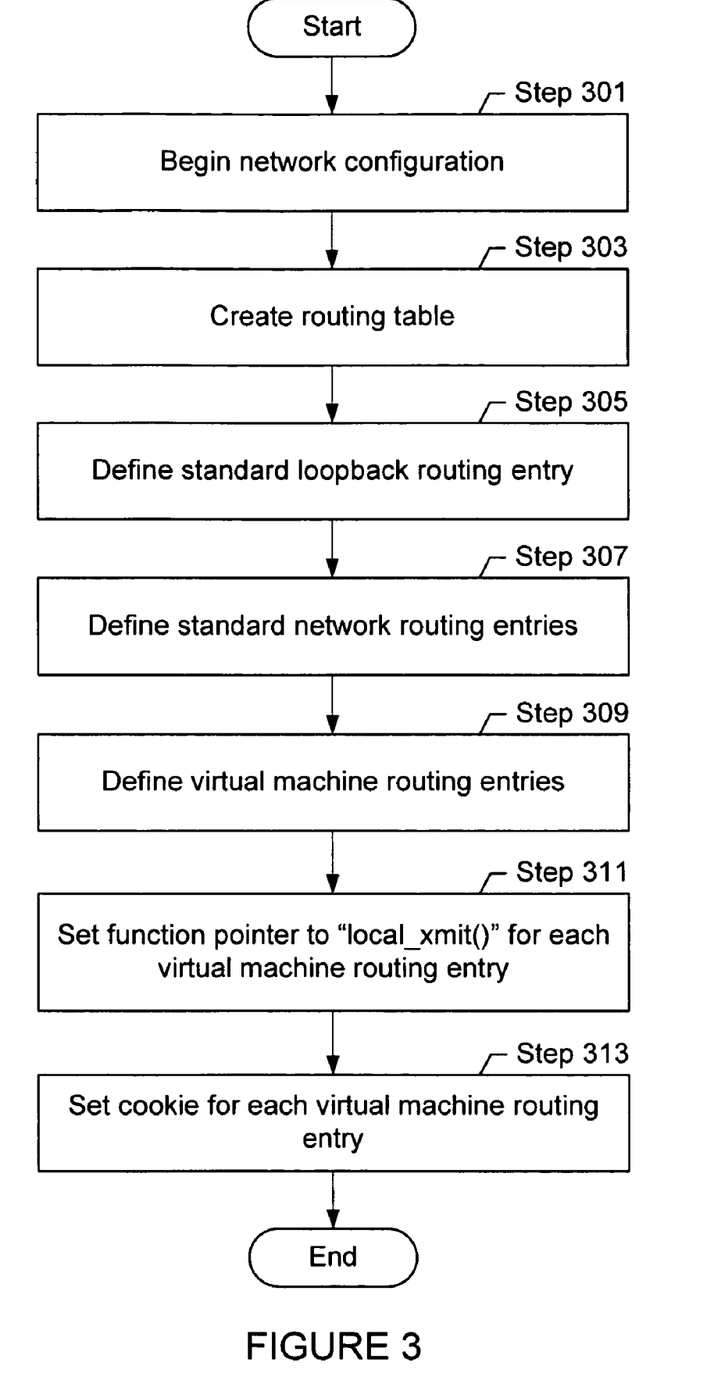
FIG. 3-4 show flow charts in accordance with one or more embodiments of the invention.

FIG. 3 shows a flow diagram in accordance with one or more embodiments of the invention. First, network configuration is started for a virtual machine (Step 301). For a virtual machine, network configuration may include connecting to a virtual NIC, connecting the virtual NIC to a physical NIC, setting bandwidth parameters, etc. Network configuration may also involve creating or editing a routing table for the virtual machine (Step 303).

Once the routing table is created, routing entries are added to the routing table. First, the standard loopback routing entry (i.e. localhost routing entry) is defined (Step 305). As stated above, the standard loopback routing entry forwards packets to the same virtual machine and commonly uses the IP address of 127.0.0.1. Packets sent through the loopback interface are transmitted without going through an external network. Next, the standard network routing entries are defined (Step 307). The network routing entries include the default routing entry and local network routing entries, which are described above. In addition, other routing entries related to other networks or subnetworks may be defined as well. For example, a routing entry for a Demilitarized Zone (DMZ) on the network may be added to the routing table. In one or more embodiments of the invention, a DMZ on a network corresponds to a network area that sits between the internal network (e.g., a LAN) and an external network, usually the Internet.

Next, the virtual machine routing entries are added (Step 309). In one or more embodiments of the invention, a virtual machine routing entry is created for each virtual machine on the host other than the virtual machine that is associated with the routing table. In addition, a virtual machine routing entry may be added to the routing table automatically upon creation of a new virtual machine on the host by the host operating system. As described above, the virtual machine routing entries allow packets destined for other virtual machines on the host to be forwarded directly to the virtual machines. These packets may be passed by calling a function referenced by a function pointer and passing the function a cookie, which contains information regarding a memory address to write to. In one or more embodiments of the invention, the function pointer and cookie are stored as fields in the routing entries of the routing table.

For each virtual machine routing entry, the function pointer is set to "local_xmit( )" (Step 311). As stated above, "local_xmit( )" is a local transmit function that passes packets to other virtual machines on the same host without accessing the network. Routing entries for external hosts are configured to point to "ext_xmit( )," which passes packets to the physical NIC; the physical NIC then passes them to the network. For each virtual machine routing entry, the cookie is also defined (Step 313). As described above, the cookie may contain a memory address referring to the receiving virtual machine; writing the packet to that memory address allows the receiving virtual machine to read the packet.

Figure 4:
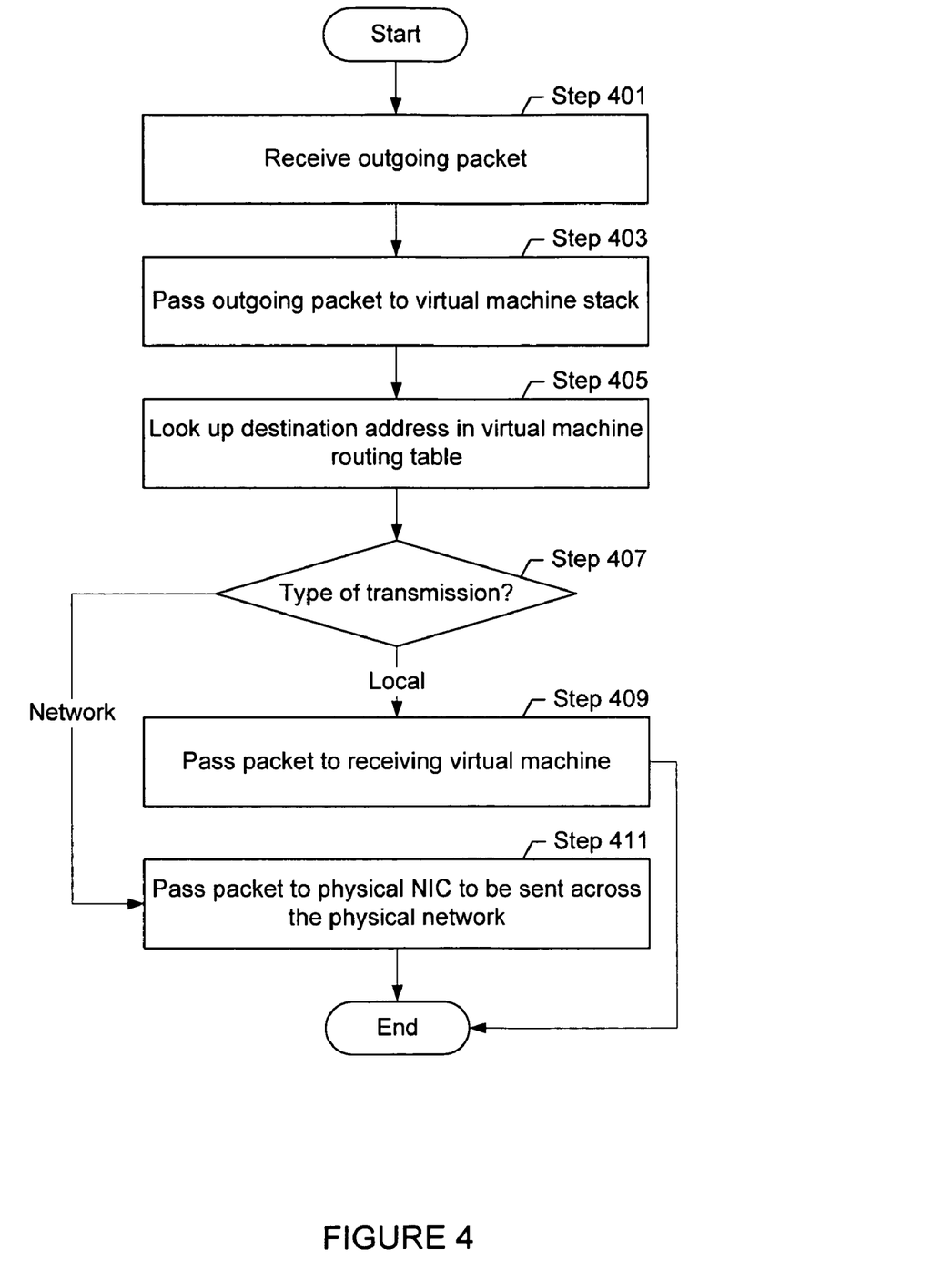

FIG. 4 shows a flow diagram in accordance with one or more embodiments of the invention. Initially, an outgoing packet is received by a virtual machine (Step 401). The outgoing packet is passed to the virtual machine stack (Step 403), where the packet's destination address is matched against routing entries in the virtual machine's routing table (Step 405). If an exact match is found, the packet is passed using the routing entry corresponding to the packet's destination address. Otherwise, the packet is passed using the default routing entry.

Next, a determination is made as to whether the packet transmission type is local or network (Step 407). If the transmission is over the network, the packet is passed to the physical NIC, where the packet is sent over the network (Step 411). In one or more embodiments of the invention, when the packet is sent over the network, the packet is passed to the next hop on the path to the packet destination, which is indicated by the gateway field of the routing entry corresponding to the packet destination. Otherwise, the packet is passed to the receiving virtual machine (Step 409) without accessing the physical network. In this case, the packet may either be passed to the virtual NIC corresponding to the receiving virtual machine, which then passes the packet to the receiving virtual machine, or the packet may be written directly to the memory space of the receiving virtual machine. Those skilled in the art will appreciate that when the packet is transmitted via a function pointer and a cookie, the determination of the packet's transmission type is implicit in calling the function pointer with the cookie, and no explicit determination is made when the packet destination is compared to entries in the routing table. In other words, the transmission type is coded into routing entries in the routing table by the host operating system.

Figure 5:
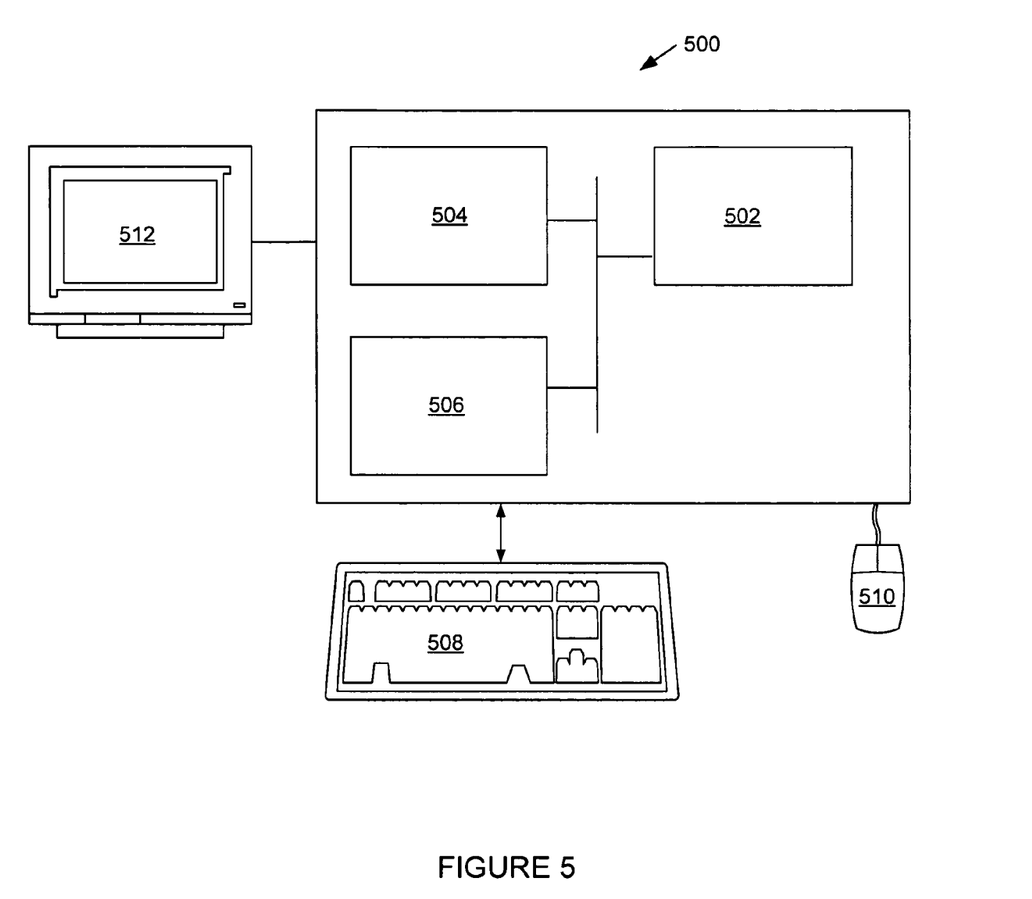
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., network interface card, virtual NICs, virtual machines) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

Embodiments of the invention allow virtual machines residing on the same physical host to transmit packets between another without accessing a physical network. Embodiments of the invention also minimize performance losses that occur when packets meant for a virtual machine on the same host are lost over a physical network. In addition, embodiments of the invention reduce overhead by using a routing table to pass packets; classification of destinations is done only when a new routing entry is added to the routing table and is implicit when the packet destination is looked up in the routing table.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for routing packets, comprising:
    receiving an outbound packet issued by a first virtual machine, wherein the first virtual machine is associated with a first virtual network interface card, and wherein the first virtual machine and the first virtual network interface card are located on a host;
    determining a packet destination associated with the outbound packet;
    querying a routing table for a routing entry corresponding to the packet destination, wherein the routing table comprises: a first routing entry referencing an external host and a second routing entry referencing a second virtual machine, wherein the second virtual machine is associated with a second virtual network interface card, and wherein the second virtual machine and the second virtual network interface card are located on the host;
    if the routing entry corresponding to the packet destination is the first routing entry:
        passing the packet to the external host; and
    if the routing entry corresponding to the packet destination is the second routing entry:
        passing the packet to the second virtual machine, wherein the packet is transmitted through the first virtual network interface card to the second virtual network interface card before being delivered to the second virtual machine.

2. The method of claim 1, wherein the packet is passed to a next hop to the external host if the routing entry corresponding to the packet destination is the first routing entry.

3. The method of claim 1, wherein the second routing entry is provided by an operating system associated with the host.

4. The method of claim 1, wherein the second virtual machine is associated with an Internet Protocol (IP) address.

5. The method of claim 1, wherein the packet is passed to the second virtual machine using a function pointer and a cookie.

6. The method of claim 5, wherein the cookie comprises a memory address corresponding to a memory space associated with the second virtual machine.

7. The method of claim 1, wherein the packet is passed to the second virtual machine by writing the packet to a memory space of the second virtual machine.

8. A system for routing packets, comprising:
    a first virtual machine and a second virtual machine located on a host;
    a first virtual network interface card located on the host and associated with the first virtual machine;
    a second virtual network interface card located on the host and associated with the second virtual machine; and
    a first routing table associated with the first virtual machine, wherein the first routing table comprises: a first routing entry referencing a first external host and a second routing entry referencing the second virtual machine; and
    a second routing table associated with the second virtual machine, wherein the second routing table comprises: a third routing entry referencing a second external host and a fourth routing entry referencing the first virtual machine,
    wherein the host is configured to:
        receive an outbound packet issued by the first virtual machine;
        determine a packet destination associated with the outbound packet;
        query the routing table for a routing entry corresponding to the packet destination;
        if the routing entry corresponding to the packet destination is the first routing entry:
            pass the packet to the external host; and
        if the routing entry corresponding to the packet destination is the second routing entry:
            pass the packet to the second virtual machine, wherein the packet is transmitted through the first virtual network interface card to the second virtual network interface card before being delivered to the second virtual machine.

9. The system of claim 8, wherein the packet is passed to a next hop to the first external host if the routing entry corresponding to the packet destination is in the first routing entry.

10. The system of claim 8, wherein the second routing entry is provided by an operating system associated with the host.

11. The system of claim 8, wherein the first routing entry and the second routing entry comprise:
    a function pointer to a passing function and a cookie.

12. The system of claim 11, wherein the cookie comprises a memory address corresponding to a memory space of the second virtual machine.

13. A computer readable medium encoded with instructions capable of being executed by a computer for causing the computer to execute a method for routing packets, the computer readable program code configured to:
    receive an outbound packet issued by a first virtual machine, wherein the first virtual machine is associated with a first virtual network interface card, and wherein the first virtual machine and the first virtual network interface card are located on a host;
    determine a packet destination associated with an outbound packet;

query a routing table for a routing entry corresponding to the packet destination, wherein the routing table comprises: a first routing entry referencing an external host and a second routing entry referencing a second virtual machine, wherein the second virtual machine is associated with a second virtual network interface card, and wherein the second virtual machine and the second virtual network interface card located on the host;

if the routing entry corresponding to the packet destination is the first routing entry:

pass the packet to the external host; and if the routing entry corresponding to the packet destination is the second routing entry:

pass the packet to the second virtual machine, wherein the packet is transmitted through the first virtual network interface card to the second virtual network interface card before being delivered to the second virtual machine.

14. The computer usable medium of claim 13, wherein the packet is passed to a next hop to the external host if the routing entry corresponding to the packet destination is the first routing entry.

15. The computer usable medium of claim 13, wherein the second routing entry is provided by an operating system associated with the host.

16. The computer usable medium of claim 13, wherein the second virtual machine is associated with an Internet Protocol (IP) address.

17. The computer usable medium of claim 13, wherein the packet is passed to the second virtual machine using a function pointer and a cookie.

18. The computer usable medium of claim 17, wherein the cookie comprises a memory address corresponding to a memory space associated with the second virtual machine.

19. The computer usable medium of claim 13, wherein the packet is passed to the second virtual machine by writing the packet to a memory space of the second virtual machine.

* * * * *

UNITED STATES PATENT AND TRADEMARK OFFICE
CERTIFICATE OF CORRECTION

PATENT NO. : 7,630,368 B2 Page 1 of 1
APPLICATION NO. : 11/479946
DATED : December 8, 2009
INVENTOR(S) : Sunay Tripathi et al.

It is certified that error appears in the above-identified patent and that said Letters Patent is hereby corrected as shown below:

In Claim 14, Column 14 (line 1), please replace "usable" with --readable--.

Signed and Sealed this

Sixteenth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,630,368 B2 Page 1 of 1
APPLICATION NO. : 11/479946
DATED : December 8, 2009
INVENTOR(S) : Tripathi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 604 days.

Signed and Sealed this

Second Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,630,368 B2
APPLICATION NO. : 11/479946
DATED : December 8, 2009
INVENTOR(S) : Sunay Tripathi et al.

It is certified that error appears in the above-identified patent and that said Letters Patent is hereby corrected as shown below:

Claim 15, Column 14 (line 5), please replace "usable" with --readable--;

Claim 16, Column 14 (line 8), please replace "usable" with --readable--;

Claim 17, Column 14 (line 11), please replace "usable" with --readable--;

Claim 18, Column 14 (line 14), please replace "usable" with --readable--; and

Claim 19, Column 14 (line 17), please replace "usable" with --readable--.

Signed and Sealed this
Fifteenth Day of May, 2012

David J. Kappos
*Director of the United States Patent and Trademark Office*